Feb. 8, 1966             B. E. KURTZ             3,233,945
CONTINUOUS TRANSFER OF SOLIDS AGAINST PRESSURE
FOR BOTTOM FEEDING OF FLUID-BED REACTORS
Filed Nov. 20, 1963                                  3 Sheets-Sheet 1

INVENTOR
BRUCE E. KURTZ

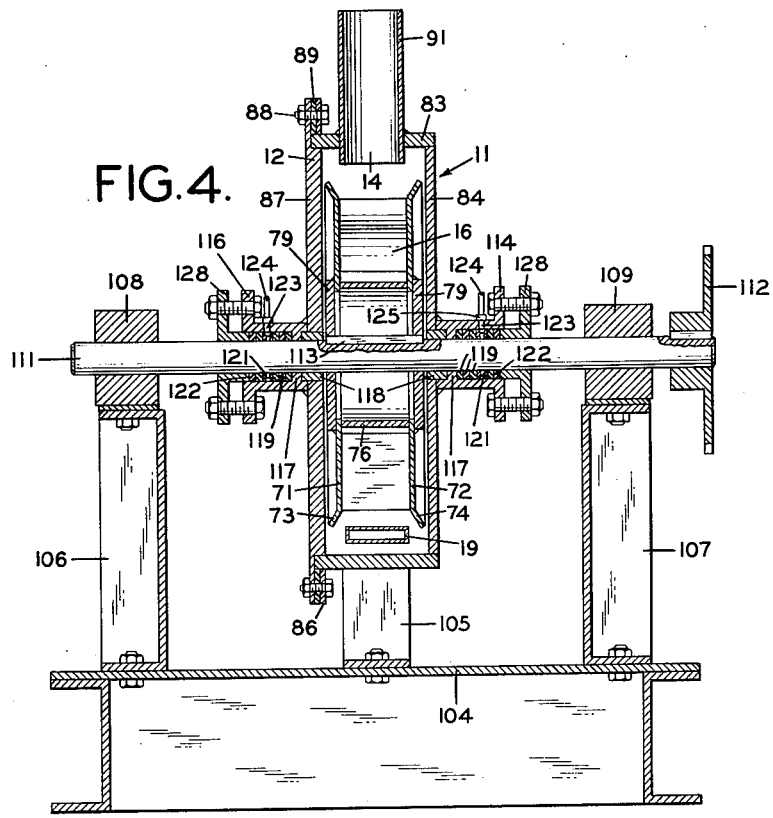
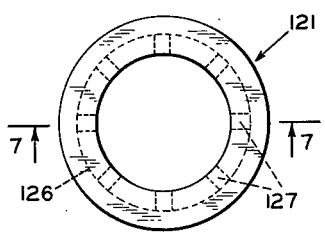
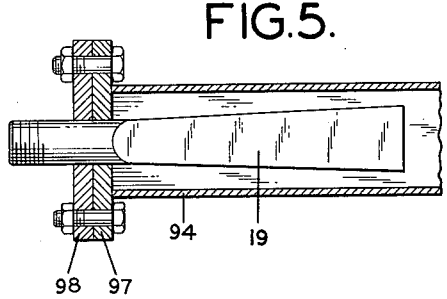
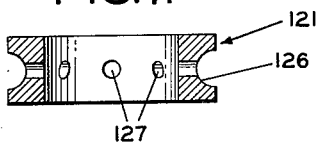

United States Patent Office 3,233,945
Patented Feb. 8, 1966

3,233,945
CONTINUOUS TRANSFER OF SOLIDS AGAINST PRESSURE FOR BOTTOM FEEDING OF FLUID-BED REACTORS
Bruce E. Kurtz, Solvay, N.Y., assignor to Allied Chemical Corporation, New York, N.Y., a corporation of New York
Filed Nov. 20, 1963, Ser. No. 325,039
19 Claims. (Cl. 302—49)

This invention relates to transfer of solids, and more particularly to new and improved apparatus for continuous transfer of solids against pressure. It is also directed to a solids handling system particularly adapted for entraining solids in a gas stream for continuous feeding into a lower section of a fluid-bed reactor.

In operation of fluid-bed reactors it has been found that certain definite advantages including high rates of through-put may be achieved by introduction of solid reactants at the bottom of the bed. Basically, bottom feeding of a fluid-bed reactor may be accomplished by entraining solid reactants in the gas stream normally introduced at the bottom of the reactor to maintain fluid-bed conditions. However, in many cases the provision of apparatus satisfactory for this purpose is not a simple matter as a number of factors must be taken into account. Important considerations in the provision of suitable apparatus include back pressure exerted by the fluid-bed and the widely varying characteristics of solids to be introduced. Moreover, apparatus suitable for bottom feeding of fluid-bed reactors should be capable of continuous uniform introduction while providing accurate control of the solids feed rate. Apparatus heretofore available for transfer of solids against pressure has been limited in one or more respects and less than completely satisfactory for continuous uniform transfer of accurately controlled amounts of highly abrasive solids against substantial back pressures in large-scale commercial operations. Devices such as star valves, vane feeders and screw feeders each have limited capability in service to feed solids against substantial back pressure as is the case with bottom feeding of reactant solids, catalyst or other contact mass to the bottom of a bed in which the solids are maintained in fluidized condition. Among the problems which these devices fail to overcome completely satisfactorily are maintenance of steady, metered, continuous flow of solids at the desired pressure. Star valves and vane feeders normally discharged only intermittently or discontinuously rather than in a continuous manner as desired for bottom feeding of fluid-bed reactors. Moreover, devices of these types provided heretofore have been subject to rapid wear making them of but limited value in the handling of abrasive solids.

Object of the present invention is to provide a new and improved apparatus for transfer of solids against pressure.

Another object of the invention is to provide new and improved apparatus for continuous bottom feeding of fluid-bed reactors.

Another object of the invention is to provide a system capable of continuous uniform transfer of solids at controlled rates against substantial back pressures and thus adapted for use in bottom feeding of fluid-bed reactors.

A further object of the invention is to provide apparatus for uniform continuous transfer of widely varying types of solids including highly abrasive solids at controlled rates against substantial back pressures for use in bottom feeding of fluid-bed reactors.

Other objects and advantages of the present invention will be apparent from the following description and accompanying drawing in which:

FIG. 3 is a sectional elevation view showing in detail with portions broken away the preferred construction and detail of a feeder wheel employed in the apparatus of the invention for continuous uniform transfer of solids.

FIG. 4 is a sectional view taken along line 4—4 of FIG. 2 showing in detail the preferred construction of the feeder wheel assembly in the apparatus of the invention.

FIG. 5 is a sectional view taken along line 5—5 of FIG. 2 showing in detail a high velocity jet nozzle for entraining solids continuously discharged from the feeder wheel.

FIG. 6 is a side elevation of a ring used in the shaft assembly in the apparatus of the invention.

FIG. 7 is a sectional view along line 7—7 of FIG. 6.

Figure 1:
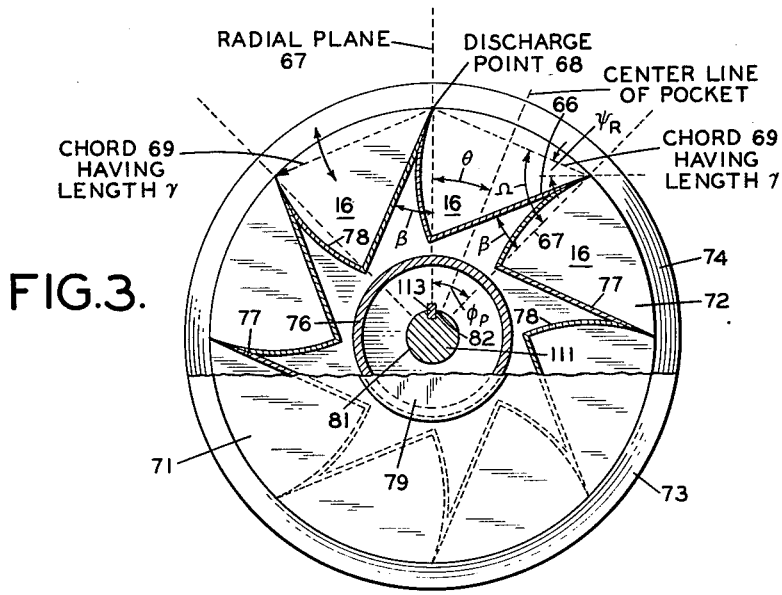
FIG. 1 is a diagrammatic view partially in section showing a solids handling system in accordance with the invention for continuous uniform bottom feeding of fluid-bed reactors.

Referring to the drawings, FIG. 1 shows a solids handling system for transfer of solids against back pressure to a fluid-bed 10. A feeder assembly 11 includes a pressure-walled housing 12 and a rotatable feeder wheel 13 having its periphery desirably spaced from the housing 12 to avoid abrasive contact and wear of these parts. Housing 12 has a feed inlet 14 which includes gas lock means operable to introduce solids intermittently or discontinuously through the feed inlet and into the pockets 16 of wheel 13 whose direction of rotation is clockwise as shown on the drawings. Pockets 16 are formed by a plurality of blades 17 which have their radial outer ends spaced from the housing 12 to permit the solids to spill from the pockets. Blades 17 are specifically constructed to spill the solids from the pockets in uniform and continuous free fall on rotation of the wheel and at a substantial distance from the feed inlet 14. The continuous stream of solids discharged from the wheel 13 descends into an entraining zone 18 in front of a high velocity jet nozzle 19 disposed below the periphery of wheel 13. Jet nozzle 19 discharges high velocity expanding gas into the solids descending into the entraining zone. The wheel blades 17 desirably have substantial width to continuously discharge a broad uniform curtain of solids into the entraining zone 18. Similarly, the high velocity jet nozzle 19 has discharge outlet of width substantially greater than thickness and preferably at least about ¾ the width of the outer ends of the blades, desirable width between about 1 to 1.5 times the width of the blades. Actual width of the jet nozzle is at least about 10 times the thickness of the nozzle, desirably between about 20–60 times the thickness of the nozzle. The broad stream of expanding gas carries the solids into a transition zone 20 which has cross-sectional area descreasing in the direction of gas flow and aligned longitudinally with the jet nozzle at the end of the entraining zone opposite the nozzle. The transition zone increases the velocity of the gas containing entrained solids for transfer through line 21 to the bottom fluid-bed 10.

The feed inlet 14 preferably includes a relatively short passageway 26 having a lower end opening into housing 12 with its upper end connected to a suitable gas lock such as gas lock valve A which in operation permits the intermittent flow of an amount of solids from a pressurizing chamber 27 through passageway 26 and into pockets 16 of feeder wheel 13. Chamber 27 is desirably an elongated chamber which may be constructed from ordinary pipe with a second gas lock valve B at the end of the chamber opposite gas lock valve A. Chamber 27 is equipped with means for creating therein a pressure at least about equal to the pressure within the housing 12 in order to facilitate rapid and uniform discharge of solids from the chamber. This may be accomplished by introducing gas from an extraneous source or, as shown in FIG. 1, by equalizing the pressure between the chamber 27 and housing 12 through a connecting line 28 having a gas lock valve C in the line to control flow of process gas and pressure. The chamber 27 receives solids introduced through valve B and a discharge outlet 29 in the lower section of hopper 31 in which the solids to be fed to the fluid-bed are stored. The hopper 31 is preferably equipped with a vibrator 34 and fluidizer 35 which utilizes a suitable gas such as air or nitrogen introduced through line 36 to assure free discharge of solids from the hopper. Valve B closes across the head of solids extending from the bottom of chamber 27 into hopper 31 to segregate solids in the chamber. As the amount of solids introduced into chamber 27 is approximately the same on each filling, the chamber may aso function as a metering section controlling the amounts of solids introduced in housing 12 and fluid-bed 10. Rotation of the feeder wheel 13 and operation of valve A are synchronized such that each pocket of the wheel is filled with about the same amount of solids as it passes beneath the feed inlet. The volumetric capacity of pressurizing compartment 27 is desirably approximately equal to the volumetric capacity of the individual pockets 16 with operation of the valve A and rotation of the wheel synchronized such that the solids discharged from pressurizing chamber 27 essentially fill the entirety of a single pocket in the wheel 13.

Figure 2:
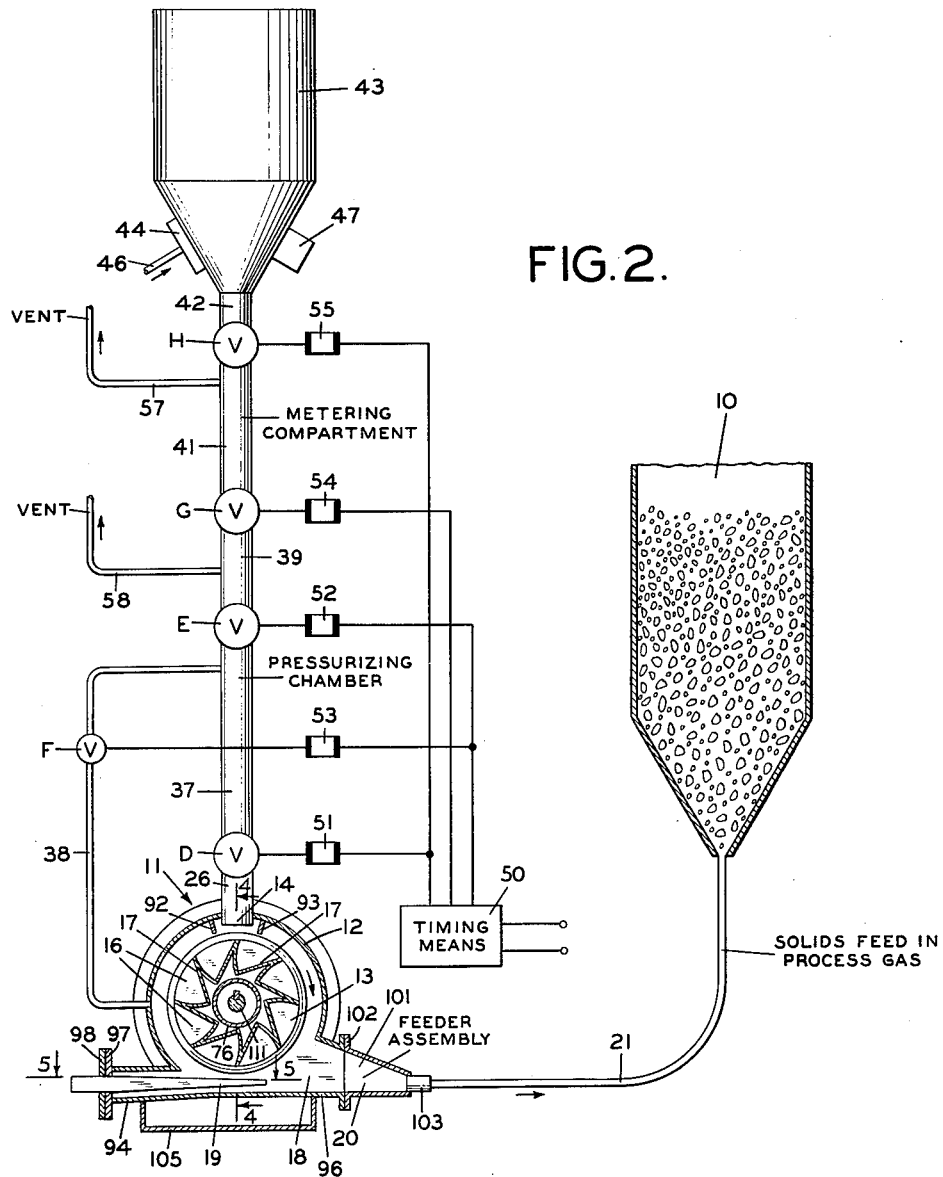
FIG. 2 is a diagrammatic view partially in section illustrating a preferred form of the apparatus of the invention for continuous uniform feeding of solids including highly abrasive solids against substantial back pressures to the bottom of a fluid-bed reactor.

FIGURE 2 illustrates the preferred solids handling system of the invention for uniform continuous feeding of highly abrasive solids against substantial back pressures to the bottom of a fluid-bed reactor. In FIG. 2 the feeder assembly is similar to the feeder assembly 11 shown in FIG. 1 and designated along with the elements thereof by like part numbers. The feed inlet 14 including passageway 26 has its lower end opening into the housing 12 and its upper end connected to gas lock valve D which on opening permits the solids in pressurizing chamber 37 to flow through feed inlet 14 and into the pockets 16 of feeder wheel 13. Pressurizing chamber 37 is an elongated chamber with a second gas lock valve E at the end of the chamber opposite gas lock valve D. Chamber 37 is equipped with means for creating therein a pressure at least about equal to the pressure within the housing 12 in order to facilitate rapid and uniform discharge of solids from the chamber. This is preferably accomplished as shown in FIG. 2 by connecting line 38 having a gas lock valve F in the line to control flow of process gas and pressure in the chamber. A connecting chamber 39 has its lower end terminating at gas lock valve E and its upper end terminating at valve G. A metering compartment 41 connects with valve G with its upper end terminating at valve H. On opening of valve H the metering compartment 41 is filled with solids introduced through a discharge outlet 42 in a lower section of hopper 43 which is equipped with a fluidizer 44 receiving gas through line 46 or with a vibrator 47 or similar means to assure free discharge of solids from the hopper. Metering compartment 41 controls the amount of solids eventually introduced into housing 12 and has volumetric capacity essentially equal to the volumetric capacity of the individual pockets 16 in the wheel 13. Metering compartment valves G and H operate alternately and should be of a type which can close across a line flooded with solids and open sufficiently to provide a straight-through port adequate to assure free flow of solids into and out of metering compartment 41. Valves G and H are preferably knife gate valves although any suitable conventional valve such as ball valves and plug valves are satisfactory for such service. Valves G and H need not be gas tight or gas locking as the metering compartment is under atmospheric pressure and not subject to back pressure in the processing system. Generally, it is only necessary that valves G and H seat tightly enough to block the flow of solids when moved to the closed position. The measured amount of solids from compartment 41 passes through connecting chamber 39 into pressurizing chamber 37 which is desirably slightly larger in capacity than metering compartment 41 such that the level of solids in the pressurizing compartment is below gas lock valve E to avoid interference with effective operation of that valve and possible loss of pressure from the processing system. The solids are discharged from pressurizing chamber 37 on operation of gas lock valve D into the housing 12 with operation of the valves and rotation of the wheel desirably synchronized such that during each cycle the solids fill essentially entirely a single pocket 16 in the wheel.

*Operation of feeder*

Operation of the preferred embodiment of the invention will be understood from FIG. 2. Operation of all five valves D through H inclusive, is synchronized with rotation of the wheel such that one complete cycle of valve operation takes place as each pocket of the wheel passes beneath the feed inlet 14. Timing means 50 such as a Type 306 "Duo-Set" timer manufactured by American Timing and Controls Company is used to control the action of the valves with the feeder wheel 13 synchronized with the valve action by suitable adjustment of a variable speed drive (not shown). Standard solenoid valves 51, 52, 53, 54, and 55 actuate valves D, E, F, G and H, respectively, in timed sequence on signal from timing means 50. Valves D, E and F are gas lock valves such as the air operated Type "A" pinch valves available from the Red Jacket Company. Valves G and H are of any suitable type capable of blocking solids flow on closing such as ball valves available as Type DZ22MT from the Jamesbury Corporation with the solenoids 54 and 55 actuating Jamesbury Type ST-20 pneumatic operators on the valves. In continuous operation the operating cycle begins with a measured amount of solids in pressurizing chamber 37 with valve F open to pressurize chamber 37 while all other valves are closed at commencement of the operating cycle. The first phase of the operating cycle begins with the opening of valves D and H. Solids from hopper 43 pass through the open valve H and fill metering compartment 41. The vent line 57 connected desirably to an upper portion of metering compartment 41 permits the venting of gas displaced in the compartment on introduction of the solids from hopper 43. Simultaneously, the measured amount of solids in pressurizing chamber 37 is discharged therefrom through the open valve D and feed inlet 14 to fill a single pocket 16 of the wheel 13. In the next phase of the operating cycle valves D, F and H are closed and valve E opens while valve G remains closed. This second phase of the operating cycle is relatively short compared to the first phase and generally of only sufficient time to permit venting of pressures from pressurizing chamber 37 and connecting chamber 39 through vent line 58 which is connected to chamber 39. At commencement of the second phase of operation the valve H closes across the solids head at the valve line and thereby segregates an accurately measured amount of solids in metering compartment 41, said solids being essentially equal to the volume of the individual pockets 16 in the wheel 13. The third phase of the operating cycle begins simply by opening of valve G which permits the measured amount of solids in metering compartment 41 to flow through connecting chamber 39 into pressurizing chamber 37. Time for the third phase is approximately the same as time for the first phase of the operating cycle. The fourth and final phase of the operating cycle is the pressurizing phase. Valve F opens and valve E closes to equalize the pressure in the feeder assembly 11 and pressurizing chamber 37 on both sides of closed valve D. Time for the pressurizing phase of the cycle is approximately the same as the venting phase or generally just about that sufficient to fully pressurize the chamber 37. During the pressurizing phase valve G is preferably also closed preparatory to the next operating cycle which commences immediately after completion of the fourth phase.

The embodiment of the invention shown in FIG. 1 may be operated in essentially a three phase cycle. The gas lock valves A, B and C may be Teflon-sleeve plugcocks such as the Type G–12 valves manufactured by the Duriron Company. Each of the valves A, B and C are equipped with suitable pneumatic operators actuated by solenoid valves 61, 62 and 63, respectively. Suitable pneumatic operators are the Model 150 valves manufactured by Bettis Corporation. The solenoid valves 61, 62 and 63 are synchronized in time sequence with the feeder wheel 12 by suitable timing means 64 which may be a Type 306 "Duo-Set" timer available from the American Timing and Controls Company. The operating cycle commences when the combined metering-pressurizing chamber 27 is empty of solids. Valve B opens to permit flow of solids from hopper 31 into the chamber 27 while valves A and C remain closed. The second phase of the operating cycle commences when valve B closes to segregate solids in the chamber 27 and valve C opens to equalize the pressure in chamber 27 with the pressure in the feeder assembly 11. Time of the second phase need be only sufficient to pressurize chamber 27 and is relatively short compared to the first phase. With chamber 27 pressurized the third phase commences with opening of valve A to allow solids in chamber 27 to flow through feed inlet 14 and fill completely and separately an individual pocket 16 in wheel 13. The third phase of the cycle terminates essentially simultaneously with commencement of the next cycle on closing of valves A and C and opening of valve B to repeat the loading of chamber 27.

*Feeder wheel design*

In order to obtain satisfactory transfer of solids for bottom feeding of fluid-bed reactors the feeder wheel 13 must be capable of discharging solids continuously and with a high degree of uniformity into the entraining zone 18. To realize the desired discharge the feeder wheel is specifically designed such that at least a portion of the discharge surface of the wheel blades is radially offset and reposed above the radial plane which contains the feeder wheel axis and intersects the outer end or discharge point of the blade, the angle of repose being generally between 2° to less than about 70°. A preferred feeder wheel design is shown in FIG. 3 with the discharge surface 66 of the blades reposed by an angle β above the radial plane 67 which intersects the discharge point 68. Excellent results are obtained in terms of uniformity of flow when discharge from the wheel is continuous with only one pocket discharging at a time. Such discharge may be realized with the preferred eight blade wheel shown in FIG. 3 when the value of angle β is about 22.5°. The optimum design of a feeder wheel having 8 or more blades may be determined differentially by defining a variable Ω which is the angle between radial plane 67 intersecting the discharge point 68 and the plane or line 69 whose surface or direction is coincident with that of the discharging solids and whose length γ is approximately equal to the distance between the discharge points of adjacent blades.

The angle Ω is therefore equal to:

$$\frac{\pi}{2} + \psi_R - \frac{\phi_p}{2} - \theta$$

with $$d\Omega = -d\theta$$

wherein θ is the angle by which the feeder wheel pocket centerline which is a line perpendicular to line 69 is displaced from the vertical, φ is the angle transected by a single pocket measured from the feeder wheel axis to the discharge point of adjacent wheel blades, and $\psi_R$ is the angle of repose of the solids discharge which is similar to the angle between the discharge surface 66 and line 69.

The differential pocket volume is then given by:

$$dV = -a\pi\gamma^2\frac{d\Omega}{2\pi} = \frac{a}{2}\gamma^2 d\theta$$

wherein a is the width of the pocket measured parallel to the feeder wheel axis. The rate of solids discharged from the wheel is therefore given by:

$$\frac{dV}{dt} = \frac{a}{2}\gamma^2\frac{d\theta}{dt}$$

Under optimum operating conditions at constant feeder wheel speed and constant discharge rate, the value of γ is also constant and the volumetric capacity of each pocket in the wheel is given by:

$$V = \frac{a\gamma^2}{2}(\Omega_1 - \Omega_2) = \frac{a\gamma^2}{2}(\theta_2 - \theta_1)$$

As $\theta_1$ can be equal to $\psi_R$ when discharge is initiated then it is also evident that:

$$\theta_2 = (\Omega_2 - \Omega_1) + \psi_R$$

The angle transected by each pocket necessary to provide for continuous flow with only a single pocket discharging at a time is determined by:

$$\phi_p = \frac{2\pi}{n} \text{ radians}$$

and thus $$\beta = \frac{\pi}{n} \text{ radians}$$

wherein n is equal to the number of pockets in the wheel. The angle of repose of the blade discharge surface (whose length is γ) is therefore inversely proportional to the number of pockets in the wheel. In the generally preferred forms of feeder wheel construction having 8 to 32 pockets the desired value of the angle β is approximately inversely proportional to the selected number of pockets and between about 22.5° to 5.5°.

*Construction details of apparatus*

The feeder wheel preferably employed in the apparatus of the invention as shown in FIG. 3 may be readily constructed from conventional metal forms such as steel plate and pipe. Two generally circular side pieces 71 and 72 may be cut from ordinary steel plate and the outer periphery of the side pieces shaped to form outwardly flared portions 73 and 74. The plates 71 and 72 each have a relatively large center opening and are spaced by a hub 76 which may readily be formed from steel pipe. The side plates 71 and 72 may be continuously welded to the hub 76 as well as to the hub side plates 79 which have a shaft opening 81 and keyway 82. The blades of the feeder wheel forming the individual pockets 16 may be constructed from a plurality of planar members 77 and shaped members 78, both obtained from ordinary steel plate. The planar members 77 and shaped members 78 are joined to side plates 71 and 72 in the desired configuration by continuous welding.

The feeder wheel 13 is placed within the housing 12 and feeder assembly 11 as shown in detail in FIGS. 1, 2 and 4. The housing 12 is constructed of a main outer shell 83 which may be formed from large diameter steel pipe. A generally circular housing side wall 84 may be cut from steel plate and joined to the inside diameter of shell 83 by a continuous weld fo sufficient strength to provide for gas-tight construction. The opposite side of housing 12 is constructed of an annular flange ring 86 continuously welded to the outer shell 83. Side wall 87 is beveled to fit the inside diameter of the main outer shell 83 and has outer diameter greater than the diameter of the shell for securing to the annular flange 86 by conventional fastening means such as bolts 88 with an intervening gasket 89 to provide for gas-tight fitting. Side wall 87 may be easily removed for inspection of the wheel. An opening in the top of the main outer shell 83 is made to fit a standard pipe 91 which serves as feed inlet for introduction of solids into the housing 12. Pipe 91 is welded continuously to the main shell 83 and has its upper portion threaded for attachment to the gas lock means forming the upper section of the feed inlet. A pair of baffles 92 and 93 are welded to the inside of the main shell 83 in association with the feed inlet pipe 91 with one baffle located on each side of the pipe approximately according to the distance between the outer end portions of adjacent wheel blades. The baffles extend downwardly such that they are narrowly spaced from the periphery of the wheel to insure introduction and retention of solids in the individual pockets of the feeder wheel 13. The lower section of the main outer shell 83 has an opening on each side of the vertical center line of the housing to separately provide for a nozzle housing section 94 and transition zone section 96. The nozzle housing section 94 may be readily formed from ordinary steel plate cut to contour fit the opening in the shell. The nozzle housing section 94 is continuously welded at the opening in the outer shell 83 and has its opposite end equipped with a flange 97. The nozzle 19 is equipped with a flange 98 mating with flange 97 for attachment to the nozzle housing section. The transition zone section 96 is securely welded in relation to the opening in the main outer shell on the side of the vertical center line opposite the nozzle housing section. The transition zone section 96 is preferably formed from individual steel plate members cut to form a zone of decreasing cross-sectional area terminating at a flange 99. A transition zone extension section 101 has a flange 102 mating with flange 99 for attachment to the feeder assembly. The transition zone extension 101 may be readily formed from rolled steel plate assembled to have decreasing cross-sectional area terminating at a pipe member 103 which is welded to the extension section. The outer end of pipe member 103 is threaded for attachment to line 21 which leads to a fluid-bed reactor 10, as shown in FIG. 1.

As shown particularly in FIG. 4, the feeder assembly is supported on a base 104 by a support shell 105 attached to the lower portion of the main outer shell 83. Base 104 supports a pair of upright mounting members 106 and 107 to which are secured bearing pillow blocks 108 and 109, respectively. The drive shaft 111 has a sprocket 112 keyed thereto for attachment of a variable speed drive (not shown). Shaft 111 fits through the opening in the side walls of the housing and is attached to the feeder wheel by a key 113. To assure smooth continuous rotation of the feeder wheel in the presence of coarse solids the feeder assembly is equipped with stuffing boxes 114 and 116 which are continuously welded to the outer surface of side walls 84 and 87, respectively, in alignment with the centerline of shaft 111. Annular shoulders 117 on the inside of each of the stuffing boxes position shaft mounted cast-iron bushings 118 between annular shoulders 117 and the hub side members 79. A series of packing rings 119—preferably Teflon impregnated and three in number—are mounted on the shaft 111 on the sides of the annular shoulders 117 opposite the bushings 118. Lantern rings 121 are mounted on the shaft between the packing rings 119 and pairs of similar outer packing rings 122. The lantern rings 121 communicate with the outer surface of stuffing boxes 114 and 116 through passageways 123 which communicate with gas lines 124 through connecting nipples 125. Line 124 is connected with a source of an inert gas such as nitrogen which during operation is continuously fed through line 124 and passageway 123 into the lantern ring where it is received in an annular channel 126 (shown FIG. 6) of lantern rings 121. The inert gas under pressure is forced through a series of spaced radial openings 127 which communicate with the shaft 111. The inert gas under pressure flows through the clearance space separating the shaft and the packing and bushing assemblies into the housing 12 and prevents intrusion of harmful abrasive dust into the stuffing boxes 114 and 116 and bushings 118. Stuffing box glands 128 have flange portions attached to the mating flange portions of the stuffing boxes and have their annular extending portions fitted against the outer packing rings 122 to secure the packing and lantern rings assembly.

The pressurizing chambers, connecting chambers and metering compartments may be constructed of ordinary steel pipe or other suitable pressure resistant material permitting accurate measurement and uniform flow of solids.

The apparatus of the invention is useful in the continuous transfer against substantial back pressures of a variety of solids and solids mixtures. The apparatus efficiently handles coarse solids and has demonstrated its utility in the bottom feeding of fluid-bed reactors with mixture of highly coarse large coke particles in admixture with oxide-bearing materials such as alumina, chromic oxide, and chromite ores.

Although certain preferred embodiments of the invention have been disclosed for purpose of illustration, it will be evident that various changes and modifications may be made therein without departing from the scope and spirit of the invention.

I claim:

1. Apparatus for continuous transfer of solids against pressure for bottom feeding of a fluid-bed reactor comprising, in combination, an enlarged pressure-walled housing, a feed inlet opening into said housing including gas lock means to introduce intermittently an amount of solids into said housing, a rotatable wheel in the housing having a plurality of pockets adapted to receive solids introduced into the housing through said feed inlet, the pockets in said wheel formed by a plurality of blades having their outer end spaced from the housing and at least a portion of the blade discharge surface radially offset and reposed above the radial plane intersecting the blade outer end to spill the solids from the several pockets as a continuous free falling stream a substantial distance from said feed inlet on rotation of the wheel, an entraining zone positioned to received the solds continuously discharged from said wheel, and a source of high velocity gas associated with said entraining zone to entrain said solids for transfer against pressure.

2. The apparatus of claim 1 in which the wheel has 8 to 32 pockets each with a discharge surface reposed above the radial plane intersecting the blade outer end by an angle of about 22.5° to 5.5°, said angle of repose being approximately inversely proportional to the number of pockets in the wheel.

3. Apparatus for continuous transfer of solids against pressure for bottom feeding of a fluid-bed reactor comprising, in combination, an enlarged pressure-walled housing, a feed inlet opening into said housing including gas lock means to introduce intermittently an amount of solids into said housing, a rotatable wheel in the housing having a plurality of pockets adapted to receive solids introduced into the housing through said feed inlet, the pockets in said wheel formed by a plurality of blades having their outer end spaced from the housing and at least a portion of the blade discharge surface radially offset and reposed above the radial plane intersecting the blade outer end to spill the solids from the several pockets as a continuous free falling stream a substantial distance from said feed inlet on rotation of the wheel, an entraining zone positioned to receive the solids continuously discharged from said wheel, a high velocity jet nozzle associated with said entraining zone to release high velocity expanding gas into the solids discharging into the entraining zone, and a transition zone having cross-sectional area decreasing in the direction of gas flow and associated with the entraining zone and the nozzle to increase the velocity of the gas containing entrained solids for transfer of the solids against pressure.

4. Apparatus for continuous transfer of solids against pressure for bottom feeding of a fluid-bed reactor comprising, in combination, an enlarged pressure-walled housing, a feed inlet opening into said housing including gas lock means to introduce intermittently an amount of solids into said housing, a rotable wheel in the housing having a plurality of pockets adapted to receive solids introduced into the housing through said feed inlet, the pockets in said wheel formed by a plurality of blades having their outer end spaced from the housing and at least a portion of the blade discharge surface radially offset and reposed above the radial plane intersecting the blade outer end to spill from the several pockets of the wheel a continuous broad free falling curtain of solids a substantial distance from said feed inlet on rotation of the wheel, an entraining zone positioned to receive said broad curtain of solids continuously discharged from said wheel, a high velocity jet nozzle having width transverse the plane of rotation at least equal to about three-quarters the width of the radial outer end portion of the wheel blades and associated with said entraining zone to rerelease high velocity expanding gas into the curtain of solids discharging into the entraining zone, and a transition zone of decreasing cross-sectional area in the direction of gas flow and associated with the entraining zone and the nozzle to increase the velocity of the gas containing entrained solids for transfer of the solids against pressure.

5. Apparatus for continuous transfer of solids against pressure for bottom feeding of a fluid-bed reactor comprising, in combination, an enlarged pressure-walled housing, a feed inlet opening into said housing including gas lock means to introduce intermittently an amount of solids into said housing, a rotatable wheel in the housing having a plurality of pockets adapted to receive solids introduced into the housing through said feed inlet, means for synchronizing the operation of the gas lock means and wheel rotation to introduce intermittently an amount of solids essentially filling the pockets of the wheel individually, the pockets in said wheel formed by a plurality of blades having their outer end spaced from the housing and at least a portion of the blade discharge surface radially offset and reposed above the radial plane intersecting the blade outer end to spill the solids from the several pockets as a continuous free falling stream a substantial distance from said feed inlet on rotation of the wheel, an entraining zone positioned to receive the solids continuously discharged from said wheel, a high velocity jet nozzle associated with said entraining zone to release high velocity expanding gas into the solids discharging into the entraining zone, and a transition zone of decreasing cross-sectional area in the direction of gas flow and associated with the entraining zone and the nozzle to increase the velocity of the gas containing entrained solids for transfer of the solids against pressure.

6. The apparatus of claim 5 in which the width of the high velocity jet nozzle transverse the plane of rotation of the wheel is at least about three-quarters the width of the radial outer end portion of the wheel blades.

7. Apparatus for continuous transfer of solids against pressure for bottom feeding of a fluid-bed reactor comprising, in combination, an enlarged pressure-walled housing, a feed inlet opening into said housing including a first gas lock valve, a chamber having one end terminating at said gas lock valve, a second gas lock valve at the end of said chamber opposite said first gas lock valve, means for synchronizing the operation of said first and second valves in timed sequence to introduce and retain an amount of solids in said chamber and then discharge the same therefrom into said housing, a rotable wheel in the housing having a plurality of pockets adapted to receive solids introduced into the housing through said feed inlet, the pockets in said wheel formed by a plurality of blades having their outer end spaced from the housing and at least a portion of the blade discharge surface radially offset and reposed above the radial plane intersecting the blade outer end to continuously spill solids from said pockets a substantial distance from said feed inlet on rotation of the wheel, an entraining zone positioned to receive the solids continuously discharged from said wheel, and a source of high velocity gas associated with said entraining zone to entrain said solids for transfer against pressure.

8. The apparatus of claim 7 in which the wheel has 8 to 32 pockets each with a discharge surface reposed above the radial plane intersecting the blade outer end by an angle of about 22.5° to 5.5°, said angle of repose being approximately inversely proportional to the number of pockets in the wheel.

9. Apparatus for continuous transfer of solids against pressure for bottom feeding of a fluid-bed reactor comprising, in combination, an enlarged pressure-walled housing, a feed inlet opening into said housing including a first gas lock valve, a chamber having one end terminating at said gas lock valve, a second gas lock valve at the end of said chamber opposite said first gas lock valve, means for synchronizing the operttion of said first and second valves in timed sequence to introduce and retain an amount of solids in said chamber and then discharge the same therefrom into said housing, a rotable wheel in the housing having a plurality of pockets adapted to receive solids introduced into the housing through said feed inlet, the pockets in said wheel formed by a plurality of blades having their outer end spaced from the housing and at least a portion of the blade discharge surface radially offset and reposed above the radial plane intersecting the blade outer end to continuously spill solids from said pockets a substantial distance from said feed inlet on rotation of the wheel, an entraining zone positioned to receive the solids continuously discharged from said wheel, a high velocity jet nozzle associated with said entraining zone to release high velocity expanding gas into the solids discharging into the entraining zone, and a transition zone of decreasing cross-sectional area in the direction of gas flow and associated with the entraining zone and the nozzle to increase the velocity of the gas containing entrained solids for transfer of the solids against pressure.

10. The apparatus of claim 9 in which there is included a line connecting the housing and chamber with a gas lock valve in said line synchronized with the first and second gas lock valves to pressurize said chamber on opening of the valve in said line.

11. Apparatus of claim 9 in which the volumetric capacity of the chamber is essentially equal to that of the individual pockets of the wheel and the first and second valves are in timed sequence to discharge the entirety of the solids in the chamber into a single pocket of said wheel.

12. Apparatus for transfer of solids against pressure for continuous bottom feeding of a fluid-bed reactor comprising, in combination, an enlarged pressure-walled housing, a feed inlet opening into said housing including a first gas lock valve, a pressurizing chamber having one end terminating at said gas lock valve, a second gas lock valve at the end of said chamber opposite said first gas lock valve, a connecting chamber having one end terminating at the second gas lock valve, a third valve at the end of said connecting chamber opposite said second gas lock valve, a metering compartment having one end terminating at said third valve, a fourth valve at the end of said compartment opposite said third valve, means for synchronizing the operation of said first, second, third and fourth valves to introduce and retain an amount of solids successively in the metering compartment and pressurizing chamber and then to release said amount of solids through the feed inlet, means synchronized with said valves for creating pressure in the pressurizing chamber to facilitate discharge of solids therefrom through said feed inlet, a rotatable wheel in the housing having a plurality of pockets adapted to receive solids introduced into the housing through said feed inlet, the pockets in said wheel formed by a plurality of blades having their outer end spaced from the housing and at least a portion of the blade discharge surface radially offset and reposed above the radial plane intersecting the blade outer end to spill solids from said pockets as a continuous free falling stream a substantial distance from said feed inlet on rotation of the wheel, an entraining zone positioned to receive the solids continuously discharged from said wheel, a high velocity jet nozzle associated with said entraining zone to release high velocity expanding gas into the solids discharged into the entraining zone, and a transition zone of decreasing cross-sectional area in the direction of gas flow and associated with the entraining zone and the nozzle to increase the velocity of the gas containing entrained solids for transfer of the solids.

13. The apparatus of claim 12 in which the volumetric capacity of the metering compartment is essentially equal to the volumetric capacity of the individual pockets of the wheel, said wheel having 8 to 32 pockets each with a discharge surface reposed above a radial plane intersecting the discharge point of the pocket by an angle of about 22.5° to 5.5°, said angle of repose being approximately inversely proportioned to the number of pockets in the wheel.

14. The apparatus of claim 12 in which the means for creating pressure in the pressurizing chamber includes a line connecting the housing and chamber with a gas lock valve in said line synchronized in operation with the first and second gas lock valves.

15. The apparatus of claim 12 in which the width of the high velocity jet nozzle transverse the plane of rotation of the wheel is at least about three-quarters the width of the radial outer end portion of the wheel blades.

16. The apparatus of claim 12 in which the volumetric capacity of the metering compartment is slightly less than the capacity of the pressurizing chamber and essentially equal to the capacity of the individual pockets of the wheel, said first gas lock valve also being synchronized in time sequence with the rotation of the wheel to essentially fill the pockets in the wheel individually on discharge of solids from the pressurizing chamber.

17. Apparatus for transfer of solids against pressure for continuous bottom feeding of a fluid-bed reactor comprising, in combination, an enlarged pressure-walled housing, a feed inlet opening into said housing including a first gas lock valve, a pressurizing chamber having one end terminating at said gas lock valve, a second gas lock valve at the end of said chamber opposite said first gas lock valve, a connecting chamber having one end terminating at the second gas lock valve, means for venting said connecting chamber to the atmosphere, a third valve at the end of said connecting chamber opposite said second gas lock valve, a metering compartment having one end terminating at said third valve and having volumetric capacity slightly less than said pressurizing chamber, a fourth valve at the end of said compartment opposite said third valve, means for venting the metering compartment to the atmosphere, means for creating pressure in the pressurizing chamber to facilitate discharge of solids therefrom through said feed inlet, a rotatable wheel in the housing having a plurality of pockets of volumetric capacity essentially equal to the capacity of the metering compartment, means for synchronizing the operation of said first, second, third and fourth valves and pressurizing means to introduce and retain an amount of solids successively in the metering compartment and pressurizing chamber and then to discharge said amount of solids through the feed inlet such that each such discharge fills essentially an individual pocket in the wheel, the pockets in said wheel formed by a plurality of blades having their outer end spaced from the housing and at least a portion of the blade discharge surface radially offset and reposed above the radial plane intersecting the blade outer end to spill solids from said pockets as a continuous broad free falling curtain a substantial distance from said feed inlet on rotation of the wheel, an entraining zone positioned to receive the solids continuously discharged from said wheel, a high velocity jet nozzle having width transverse the plane of rotation at least about three-quarters the width of the outer end of the wheel blades and associated with the entraining zone to release high velocity expanding gas into the solids discharged into the entraining zone, and a transition zone having cross-sectional area decreasing in the direction of gas flow and associated with the entraining zone at the end of said zone opposite the nozzle to increase the velocity of the gas containing entrained solids for transfer of the solids against pressure.

18. The apparatus of claim 17 in which the outer peripheral portions of the rotatable wheel are outwardly flared and the housing is equipped with a baffle on each side of the feed inlet narrowly spaced from the periphery of the wheel and located approximately according to the distance between the outer end portion of adjacent wheel blades to insure introduction and retention of solids in the individual pockets of said wheel.

19. The apparatus of claim 17 in which the volumetric capacity of the metering compartment is essentially equal to the volumetric capacity of the individual pockets of the wheel, said wheel having eight pockets each with essentially a planar discharge surface reposed above a radial plane intersecting the discharge point of the pocket by an angle of about 22.5°.

References Cited by the Examiner

UNITED STATES PATENTS

| | | | |
|---|---|---|---|
| 1,609,401 | 12/1926 | Crites | 302—49 |
| 1,685,331 | 9/1928 | McLaughlin | 302—49 |
| 2,099,315 | 11/1937 | Prochazka | 302—49 |
| 2,663,465 | 12/1953 | Hogin | 222—368 |

SAMUEL F. COLEMAN, *Primary Examiner.*

ANDRES H. NIELSEN, *Examiner.*